US012440007B2

(12) United States Patent
Reginelli et al.

(10) Patent No.: US 12,440,007 B2
(45) **Date of Patent: *Oct. 14, 2025**

(54) DEVICE COMPRISING DECORATIVE OBJECTS HAVING RESTRAINED FREEDOM TO MOVE AND SUSPENDED IN FLUID

(71) Applicant: Preciflex SA, Neuchâtel (CH)

(72) Inventors: Sandro Reginelli, La Neuveville (CH); Toralf Bork, Enges (CH); Jean Gubelmann, Yverdon-les-Bains (CH); Johann Rohner, Pomy (CH); Mathieu Oulevey, Lausanne (CH); Luc Maffli, Fribourg (CH); Alain Jaccard, Sainte-Croix (CH)

( * ) Notice: Subject to any disclaimer, the term of this patent is extended or adjusted under 35 U.S.C. 154(b) by 743 days.

This patent is subject to a terminal disclaimer.

(21) Appl. No.: 17/598,899

(22) PCT Filed: Mar. 30, 2020

(86) PCT No.: PCT/IB2020/053025

§ 371 (c)(1),
(2) Date: Sep. 28, 2021

(87) PCT Pub. No.: WO2020/201993

PCT Pub. Date: Oct. 8, 2020

(65) Prior Publication Data

US 2022/0183428 A1 Jun. 16, 2022

Related U.S. Application Data

(60) Provisional application No. 62/828,672, filed on Apr. 3, 2019.

(51) Int. Cl.
*A44C 15/00* (2006.01)
*G04B 37/02* (2006.01)
(Continued)

(52) U.S. Cl.
CPC .............. *A44C 15/00* (2013.01); *G04B 37/02* (2013.01); *G04B 45/0023* (2013.01); *G04B 47/044* (2013.01); *G09F 13/24* (2013.01)

(58) Field of Classification Search
CPC ... A44C 25/00; A44C 17/0241; A44C 17/025; A44C 17/0275; A44C 17/0283; A44C 17/0291; A44C 17/02; G04B 45/0023
See application file for complete search history.

(56) References Cited

U.S. PATENT DOCUMENTS 3,271,897 A 9/1966 Gelinas
4,196,535 A 4/1980 Heimo
(Continued)

FOREIGN PATENT DOCUMENTS

CN 2153823 Y 1/1994
CN 201370347 Y 12/2009
(Continued)

OTHER PUBLICATIONS

International Search Report, International patent application No. PCT/IB2020/053025, Jun. 29, 2020.

*Primary Examiner* — Jack W Lavinder
(74) *Attorney, Agent, or Firm* — DA VINCI PARTNERS LLC; John Moetteli

(57) ABSTRACT

A decorative, wearable system includes at least one decorative element mechanically and moveably suspended in a liquid by mechanical fixation elements. The liquid shares a substantially similar refraction index as at least one of mechanical fixation elements.

22 Claims, 19 Drawing Sheets

(51) Int. Cl.

| | |
|---|---|
| ***G04B 45/00*** | (2006.01) |
| ***G04B 47/04*** | (2006.01) |
| ***G09F 13/24*** | (2006.01) |

(56) References Cited

U.S. PATENT DOCUMENTS

| | | | | | |
|---|---|---|---|---|---|
| 4,578,044 | A * | 3/1986 | Saitoh | A63H 33/26 446/156 |
| 4,588,618 | A | 5/1986 | Wolfe | |
| 4,939,859 | A * | 7/1990 | Bradt | A63H 23/08 40/406 |
| 5,050,876 | A * | 9/1991 | Chuang | A63F 9/34 40/426 |
| 5,272,681 | A * | 12/1993 | Lee | G04B 45/0061 368/76 |
| 5,292,564 | A * | 3/1994 | Lee | G09F 19/02 40/406 |
| 5,483,764 | A * | 1/1996 | Lin | G09F 19/08 446/131 |
| 5,619,816 | A | 4/1997 | Ellison | |
| 2007/0234757 | A1* | 10/2007 | Sherman | A44C 25/002 63/18 |
| 2009/0266305 | A1 | 10/2009 | Pavlowski | |
| 2018/0295953 | A1* | 10/2018 | Vouillamoz | A44C 5/0007 |

FOREIGN PATENT DOCUMENTS

| | | | |
|---|---|---|---|
| CN | 201587264 | U | 9/2010 |
| CN | 108348052 | A | 7/2018 |
| CN | 109778774 | A | 9/2018 |
| GB | 2235793 | A | 3/1991 |
| JP | 2005837623 | A | 8/2005 |
| JP | 3135480 | U | 9/2007 |
| JP | 2009085758 | A | 4/2009 |
| JP | 201913380 | A | 1/2019 |
| WO | WO-2004021389 | A2 | 11/2022 |

* cited by examiner

500
FIG.5A
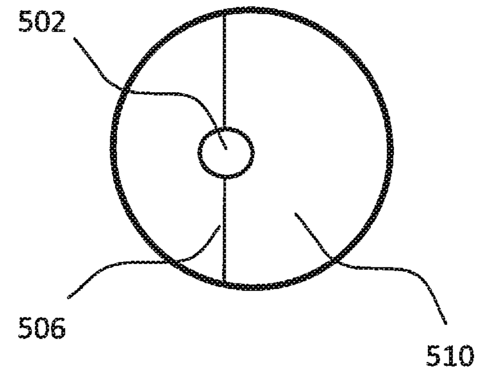
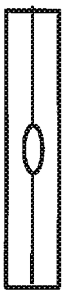
FIG.5C
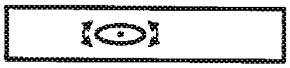
FIG.5B
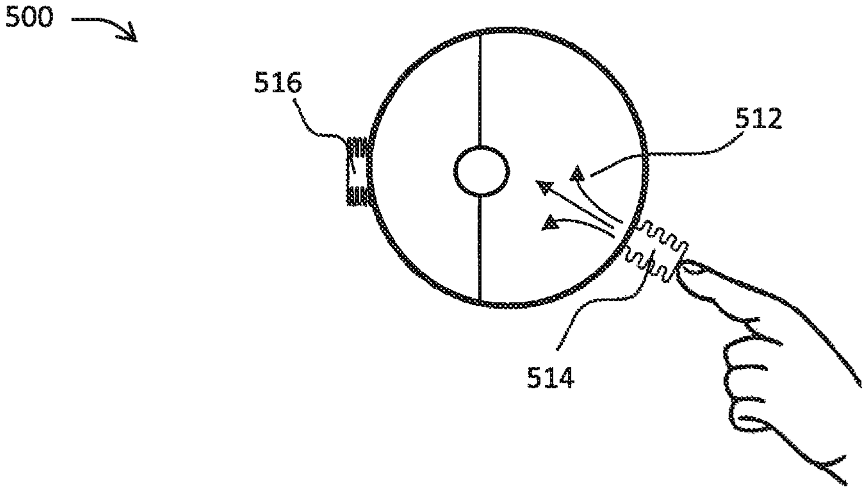
FIG.5D

FIG.6A
FIG.6C
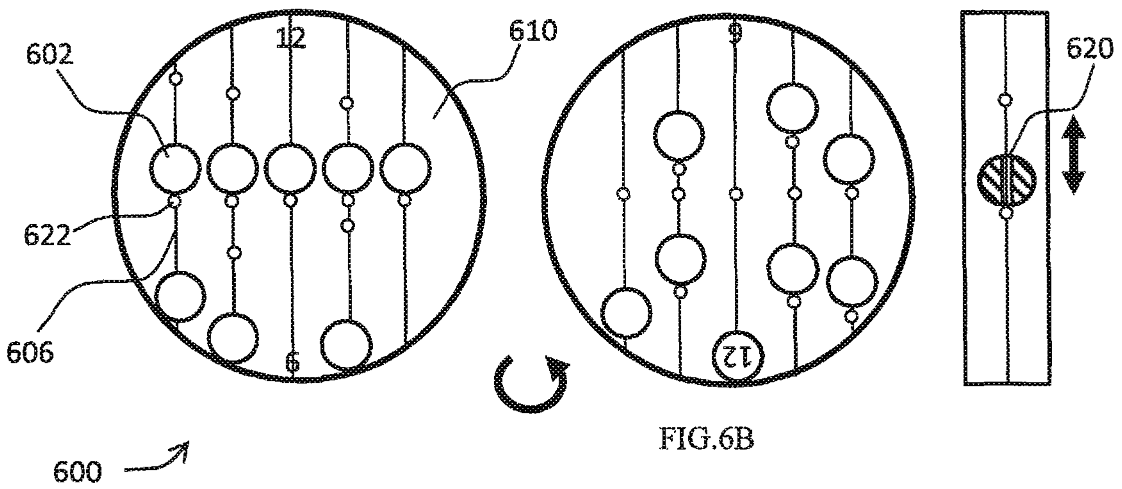
FIG.6B
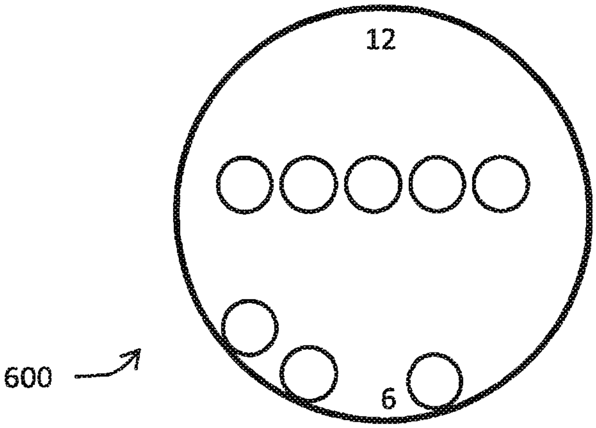
FIG.6D

DEVICE COMPRISING DECORATIVE OBJECTS HAVING RESTRAINED FREEDOM TO MOVE AND SUSPENDED IN FLUID

CROSS REFERENCE TO RELATED APPLICATIONS

This application is the National Stage of International Application No. PCT/IB2020/053025, filed Mar. 30, 2020, which claims benefit under 35 USC § 119(a), to U.S. provisional patent application Ser. No. 62/828,672, filed Apr. 3, 2019, and to International Application No. PCT/IB2019/058379, filed Oct. 2, 2019.

COPYRIGHT & LEGAL NOTICE

A portion of the disclosure of this patent document contains material which is subject to copyright protection. The Applicant has no objection to the facsimile reproduction by anyone of the patent document or the patent disclosure as it appears in the Patent and Trademark Office patent file or records, but otherwise reserves all copyright rights whatsoever. Further, no references to third party patents or articles made herein is to be construed as an admission that the present invention is not entitled to antedate such material by virtue of prior invention.

BACKGROUND OF THE INVENTION

The invention relates to wearable accessories such as jewelry.

Most accessories are objects with a permanent shape and decoration.

What is needed is a new way to make accessories more alive by allowing their appearance to change.

SUMMARY OF THE INVENTION

A system and method/apparatus is provided which provides means to create an apparently living decoration for personal accessories. The system is a decorative, wearable device which includes at least one decorative element mechanically and moveably suspended in a fluid by mechanical fixation elements. The fluid shares a substantially similar refraction index as at least one of mechanical fixation or mobile elements.

An object of the invention is to animate, tilt or move decorative objects.

Another object of the invention is to provide a device that changes its appearance when animated, tilted or moved.

Still another object of the invention is to provide an invisible and partially tiltable or moveable fixation to objects and thus provide a magical effect.

BRIEF DESCRIPTION OF THE DRAWINGS

The attached drawings represent, by way of example, different embodiments of the subject of the invention.

FIG. 5A is a top schematic view of a further animated face decoration according to the invention.

FIG. 5B is a cross-section view of the decoration of FIG. 5A.

FIG. 5C is an alternate cross-section view of the decoration of FIG. 5A.

FIG. 5D is a top schematic view of an alternate animated face decoration according to the invention.

FIG. 6A is a top view of a further animated face decoration according to the invention.

FIG. 6B is a top view of the view of FIG. 6A rotated 180 degrees.

FIG. 6C is a right side view of the decoration of FIG. 6A.

FIG. 6D is a top view of the view of FIG. 6A in which the fixation means are invisible.

Figure 1A:
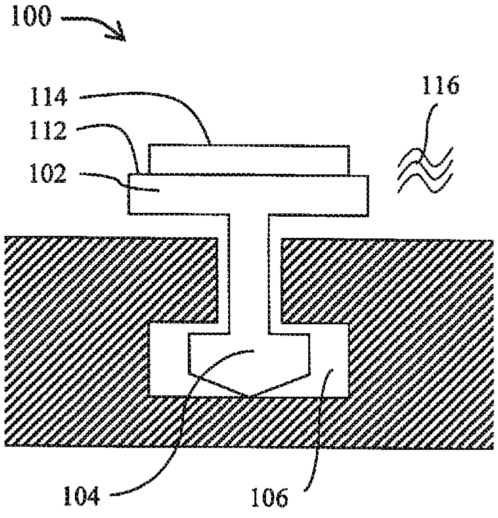
FIG. 1A is a cross-section view of a fixation arrangement of the invention, having a decorative element.

Those skilled in the art will appreciate that elements in the Figures are illustrated for simplicity and clarity and have not necessarily been drawn to scale. For example, dimensions may be exaggerated relative to other elements to help improve understanding of the invention and its embodiments. Furthermore, when the terms 'first', 'second', and the like are used herein, their use is intended for distinguishing between similar elements and not necessarily for describing a sequential or chronological order. Moreover, relative terms like 'front', 'back', 'top' and 'bottom', and the like in the Description and/or in the claims are not necessarily used for describing exclusive relative position. Those skilled in the art will therefore understand that such terms may be interchangeable with other terms, and that the embodiments described herein are capable of operating in other orientations than those explicitly illustrated or otherwise described.

DETAILED DESCRIPTION OF THE PREFERRED EMBODIMENT

The following description is not intended to limit the scope of the invention in any way as it is exemplary in nature, serving to describe the best mode of the invention known to the inventors as of the filing date hereof. Consequently, changes may be made in the arrangement and/or function of any of the elements described in the exemplary embodiments disclosed herein without departing from the spirit and scope of the invention.

The system according to this invention includes at least one decorative element mechanically and moveably suspended in a fluid by mechanical fixation elements, the fluid sharing a substantially similar refraction index as at least one of mechanical fixation or mobile elements.

Referring now to FIG. 1A to 1E, a system 100 with one or more floating decorative elements 102, and the floating elements are restrained in their freedom to move or tilt. The floating decorative elements 102 may comprise movable pillars or standoffs 104 (either machined out of bulk material to be mechanically kept in place or individually assembled into recesses 106). Movement is restrained by geometry of an end 110 in the recess 106 (such as in a lose dovetail interconnection allowing ample clearance for movement), for example, to a certain angles in all planar direction. These pillars 104 could have a larger top portion 112 which could be coated with gold 114 for instance to get a paillettes or glitter effect from light reflection when juxtaposed with other such floating decorative elements 102. The pillars 104 could be also coated with other types of metal as well, as herein described. Also a protective layer (not shown but covering the surfaces which are to be isolated) could be applied in order to avoid reaction between the pillars and the surrounding fluid 116. Combinations of the different types of layers are possible. Further, individual precious parts or decoration could be placed on these pillars 104, or on the top portion 112 thereof.

Figure 1B:
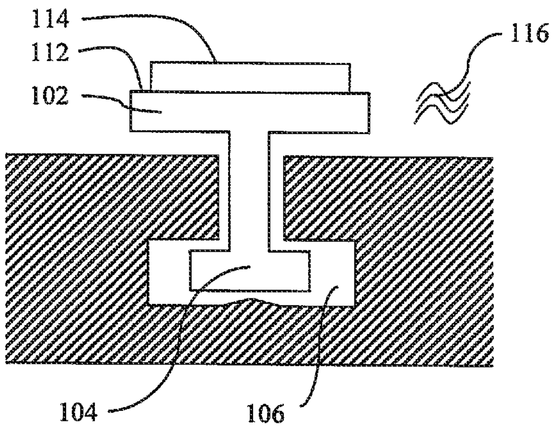
FIG. 1B is a cross-section view of a first alternative fixation arrangement of the invention.
Figure 1C:
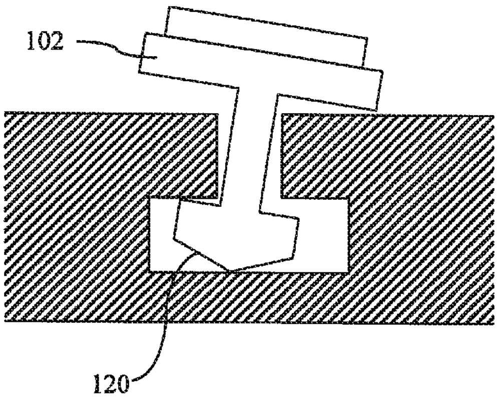
FIG. 1C is a cross-section view of the fixation arrangement of FIG. 1A, having the decorative element in another position.
Figure 1D:
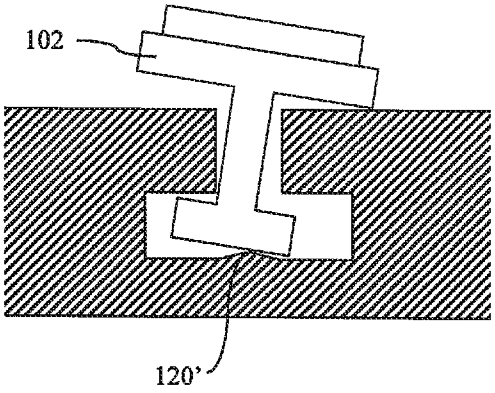
FIG. 1D is a cross-section view of the first alternative fixation arrangement of FIG. 1C, having the decorative element in another position.
Figure 1E:
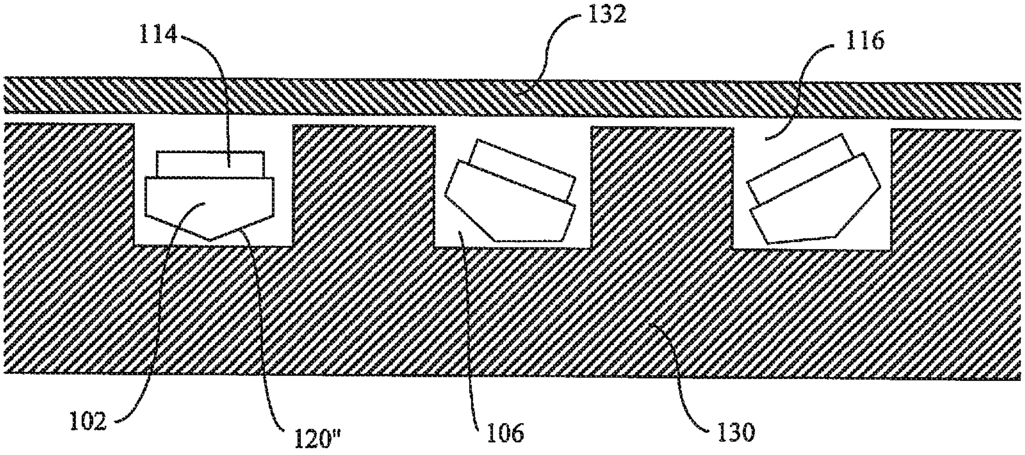
FIG. 1E is a cross-section view of second alternate series of fixation arrangements of the invention.

Referring in particular to FIGS. 1B and 1E, inclining of the floating decorative elements 102 can be enforced or promoted by geometric feature (such as inclined surface 120, 120', 120") below the pillar 104. In addition, the combination of the pillar/recess shaping can alternatively be used or combined to predetermine the inclining direction.

Referring in particular to FIG. 1E, the floating decorative elements 102 may also be held between a bottom plate 130 and a top plate 132. Bottom plate 130 and top plate 132 is advantageously made of a material with a refraction index similar to the refraction index of the surrounding fluid 116 so as to be substantially invisible to the wearer.

Pillar and support material made from a glass material to which an index matching liquid can be found.

Figure 2:
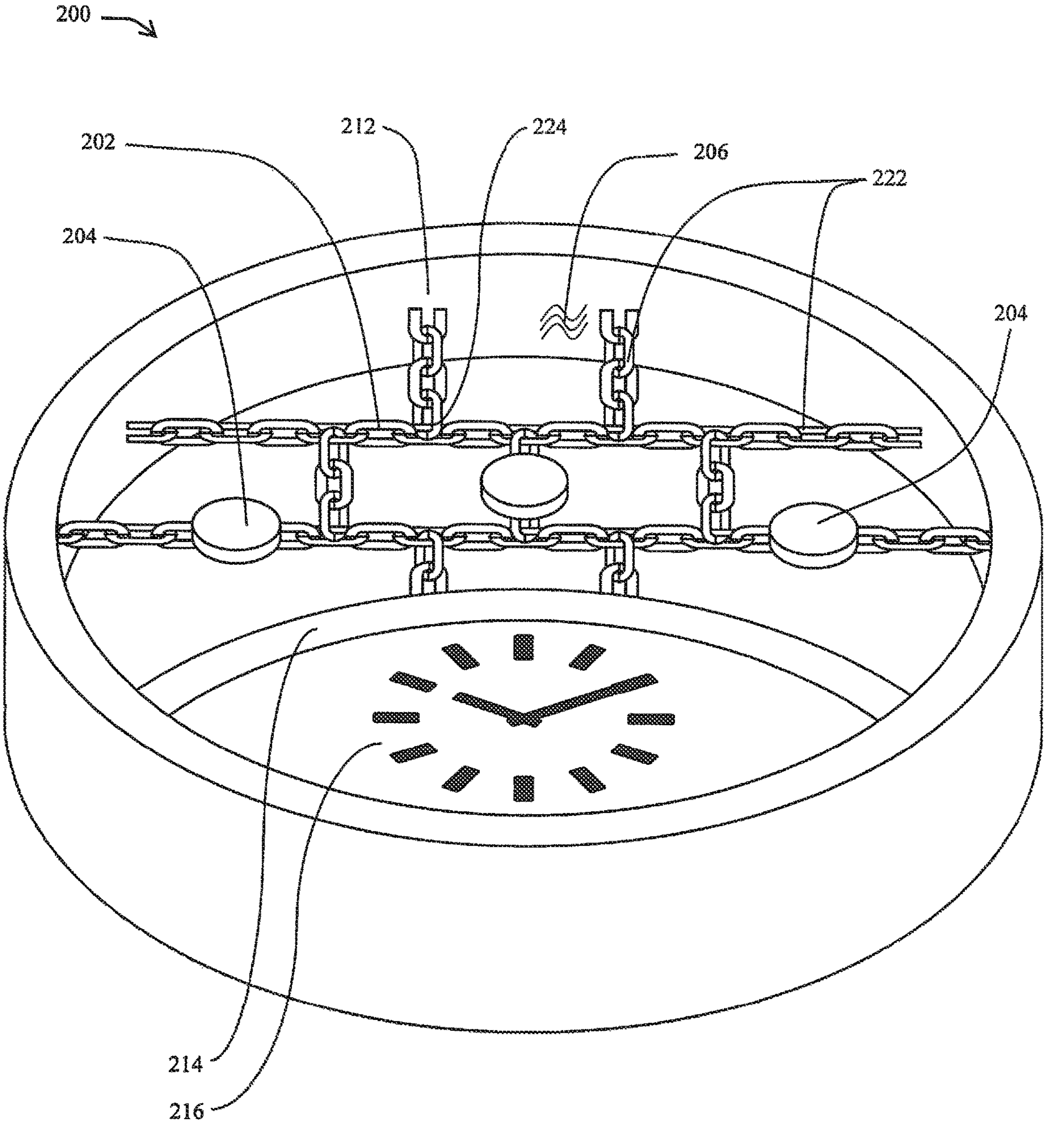
FIG. 2 is a top schematic view of a watch face using elements of the invention.

Referring now to FIG. 2, a system 200 of a glass chain mesh 202 machined out of bulk glass material to which a refraction index matching liquid 206 can be found. The glass chain mesh 202 includes links 222 connecting to knots 224 and a frame 212. A frame bridge 214 demarks a watch face 216 with hands or another indicator such as temperature.

The mesh 202 is suspended in a frame made from the same bulk material. The mesh links 222 are structured in such a way so that the mesh interlinking knots 224 can move in a limited way in plane. These knots 224 can be structured to contain a larger surface on which coatings can be applied or other things be mounted on them. Decorative elements 204 may be mounted on the links or on the knots to form a picture.

Figure 3A:
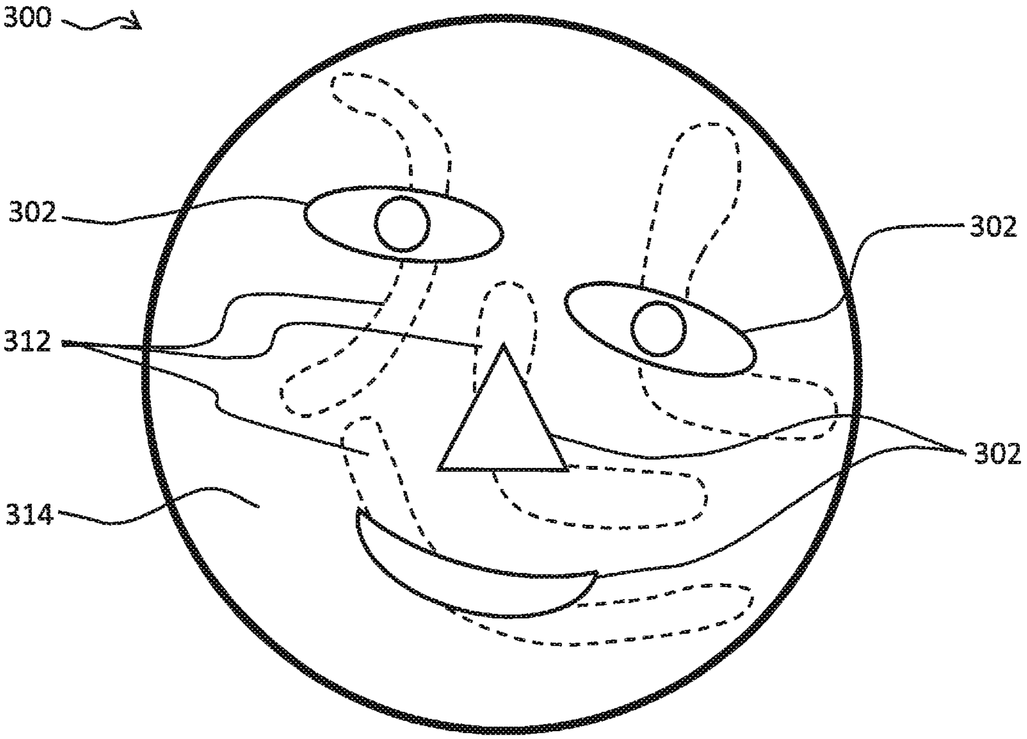
FIG. 3A is a top schematic view of an animated face decoration according to the invention.
Figure 3B:
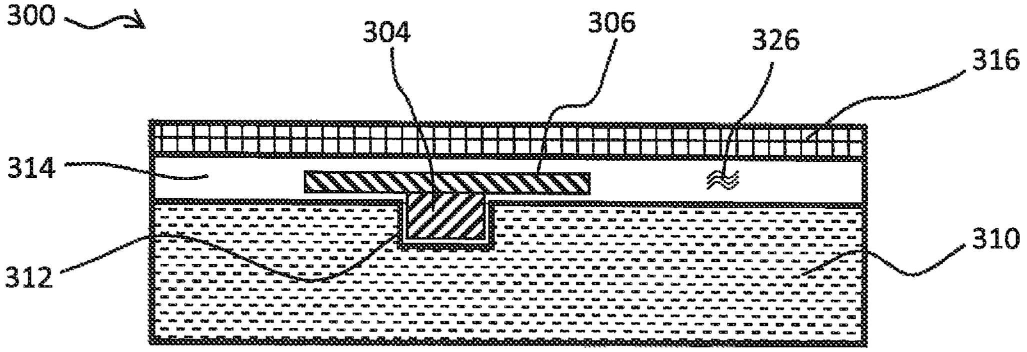
FIG. 3B is a cross-section view of the decoration of FIG. 3A.

Referring now to FIG. 3A to 3B, a system 300 where decorative moving parts 302 are guided by channels 312. The substrate 310 is made of transparent material wherein the channels 312 could be etched by laser for instance. Alternative processes for creating the channels 312 in the substrate 310 may use chemical etching, spark-assisted chemical etching, mechanical machining, injection molding, hot embossing, or any combination of such processes. The decorative moving part 302 may be composed with a support 304 made of any material that can slide in the channel 312. Any precious element 306 could be mounted on the support 304.

A fluid 326 fills the cavity 314 that matches the refractive index of substrate 310 to make the channels 312 invisible. For example a crystal 316 closes the cavity 314 and is of transparent material. Moreover, the fluid 326 may be a liquid and act as lubricant on the system. The liquid may be transparent or colored.

The gravity is the actuation principle. However, gravity can be substituted with any other actuation principle that creates an acceleration or deceleration force.

The geometry of the moving parts 302 and their sliding paths made of channels 312 is selected so as to avoid the system getting stuck in a position.

The support 304 of the decorative moving part 302 may be round so that the moving part can turn itself around in the channel 312 thus changing the orientation of the precious element 306. On the other hand, the shape of the support 304 may be designed in order to limit the rotation of the decorative moving parts 302.

Figure 4A:
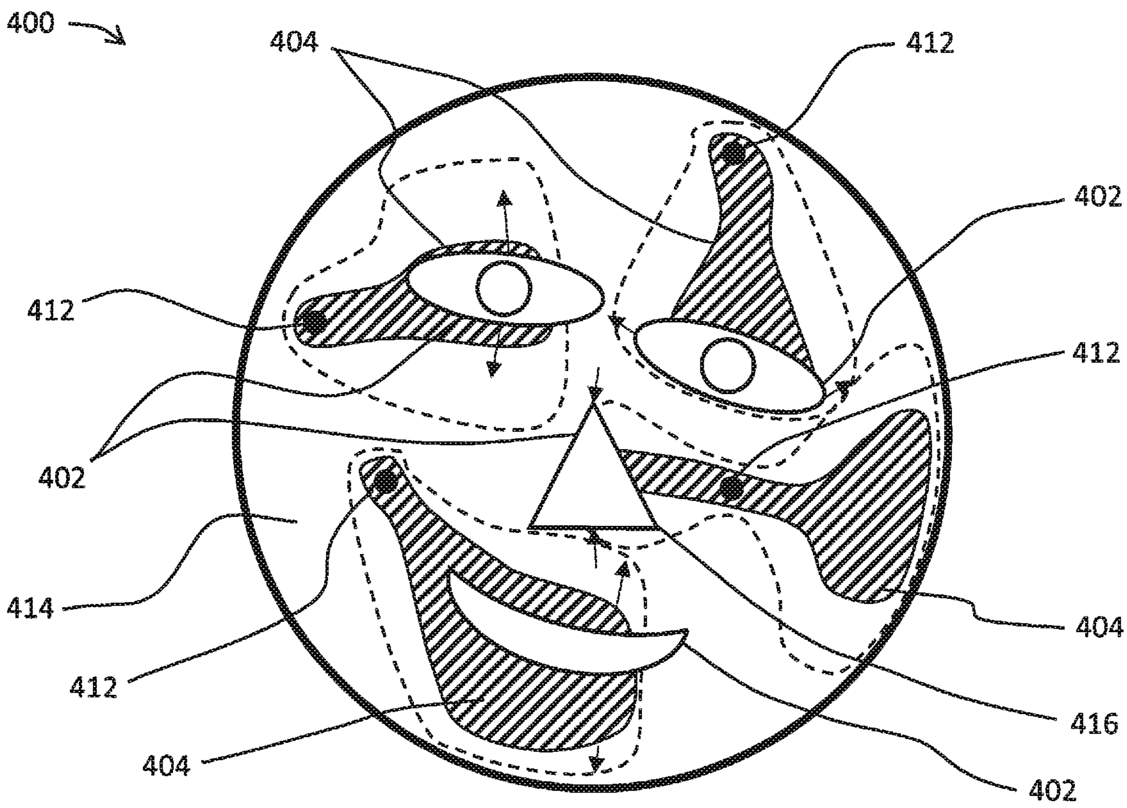
FIG. 4A is a top schematic view of another animated face decoration according to the invention.
Figure 4B:
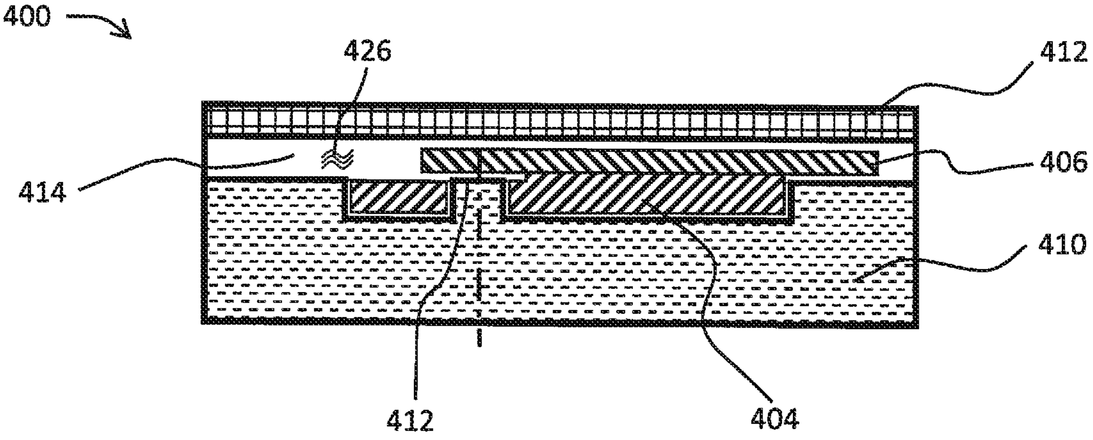
FIG. 4B is a cross-section view of the decoration of FIG. 4A.
Figure 5E:
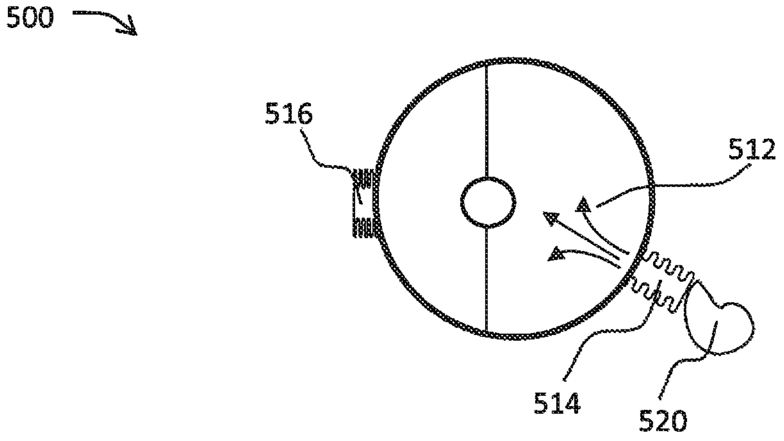
FIG. 5E is a top schematic view of a further animated face decoration according to the invention.
Figure 6E:
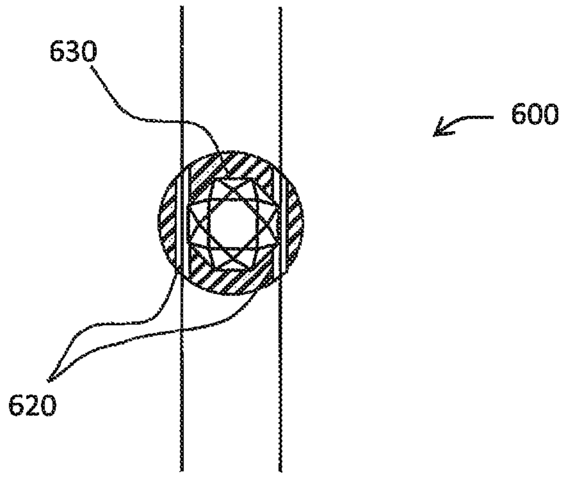
FIG. 6E is a top view of a decoration suspended in the arrangements of FIGS. 6A-6D.

Referring now to FIG. 4A to 4B, a system 400 where the decorative moving parts 402 are guided in rotation around pillars 412. The substrate 410 is in transparent material wherein the pillars 412 could be etched by laser for instance. Alternative processes for creating the pillars 412 in the substrate 410 may use chemical etching, spark-assisted chemical etching, mechanical machining, injection molding, hot embossing, or any combination of such processes. The decorative moving part 402 may be composed with a support 404 whereon any precious element 406 could be mounted. The supports 404 could be made in the same transparent material. The supports 404 might be hidden by the precious element 406.

A fluid 426 fills the cavity 414 that matches the refractive index of the transparent material to make the pillars 412 and the supports 404 invisible. Moreover, the fluid 426 may be a liquid and may act as lubricant on the system. The liquid 426 can be transparent or colored.

The gravity is the actuation principle. The gravity can be substituted with any other acceleration or deceleration force.

The geometry of the rotating parts is designed in order to avoid the system getting stuck in a position. The support 404 of the rotating part could be limited in their movement by the etched structure of the substrate 410.

It is possible to make counter intuitive movements when the rotating parts have a bigger mass on the other side of the rotating axis defined by the pillar 412 as shown with the nose 416 of the FIG. 4A.

Referring now to FIG. 5A to 5E, a system 500 where a solid decorative element 502 is fixed to a thin fibre 506 surrounded by a fluid 510. The fibre 506 has the same refractive index as the surrounding fluid 510 making it invisible. The fluid may be a liquid. The fluid may be transparent or colored. Due to the torsion of the fibre 506, the solid decorative element 502 can twist slightly around the fibre, giving an effect of movement.

In one embodiment, a flow 512 of the fluid 510 is generated by the compression of a first flexible chamber 514. The fluid 510 displaced by the compression of the first flexible chamber 514 fills the secondary flexible chamber 516, and when the pressure on the first flexible chamber 514 is released, the fluid 506 moves back to its original state, generating a flow in the opposite direction. The actuation of the first flexible chamber 514 can be actuated manually or by a mechanical system 520. Of course, the positioning of the flexible chambers 514 and 516 shown here are shown in an exemplary manner and may be positioned differently.

Referring now to FIG. 6A to 6E, a system 600 comprising a chamber with one or more fibres 606, the fibres attached at side walls of the chamber and spaced apart from each other or with a defined spacing, all being surrounded by fluid 610. The fibres 606 have the same refractive index as the fluid(s) 610 so that they are made invisible. The fluid(s) may be transparent or colored. Mobile solid decorative elements 602 can move along the fibres 606, guided by a hole 620 through which they are linked to the fibres 606. Optionally, some stopping elements 622 made with similar index of refraction as the fluid are fixed at specific location of the fibres 606 and restrict the displacement of the mobile decorative elements 602 along the fibres 606. Depending on the orientation of the device and the position of the stopping elements, the mobile decorative elements 602 can be arranged in a predefined manner. For example, they can be aligned horizontally when the device is vertical and randomly disposed when the device is upside down. In one embodiment, the one or more mobile decorative elements 602 can be made of precious elements 630 or the precious element can be mounted on one or more mobile elements. The mobile decorative elements 602 may be guided by two fibres in order to ensure a defined orientation.

Referring now to FIGS. 7A to 7B, and FIGS. 8A and 8B, a system 700 to be integrated in a wearable accessory, comprises a decorative element 702. The system may move in one or more directions as biased by gravity, or by a movement of the user wearing the accessory, or by an external force, or by the user triggering the movement of the surrounding fluid(s) 726, or by a mechanical transmission moving the guiding element 706; such mechanical transmission may be activated by the user or by a clock system, such clock system being electrically or mechanically powered and may be electronically controlled. The decorative element 702 is attached by an attachment 704 to a guiding element 706. Such attachment 704 may be completely rigid, or allow for some movement freedom (slack in one or more directions). The guiding element 706 may have the same refraction index as the surrounding fluid 726 so as to be invisible. The guiding element 706 is affixed to a support 722 via a guiding feature 724, the support being for example attached to a decoration image background. The support 722 may have the same refraction index as the surrounding fluid 726 to be invisible. The surrounding fluid 726 may be a liquid. The surrounding fluid 726 may be transparent or colored. A guiding feature 724 for the guiding element 706 may allow for one or more directions of free movement. The decorative element 702 may be moved by gravity, by the movement of the surrounding fluid(s) 726, or by mechanical action on the guiding element 706, or any combination thereof.

Figure 7A:
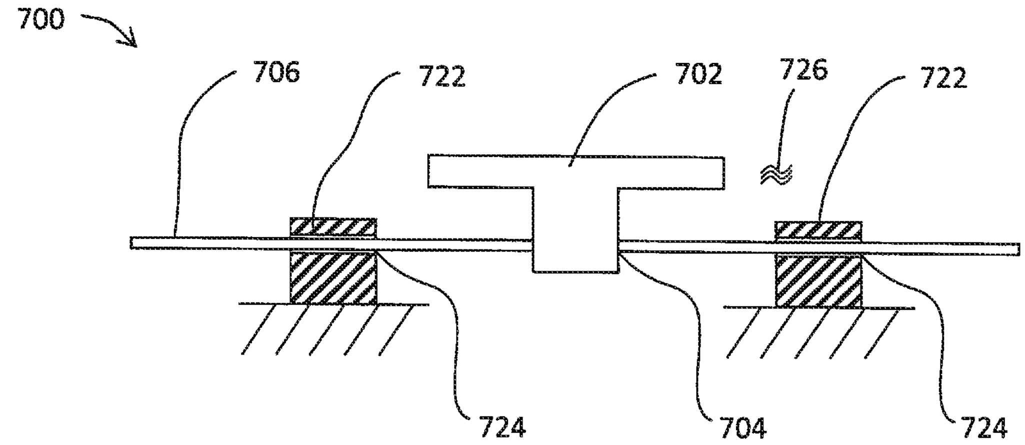
FIG. 7A is a cross-section view of a still further animated face decoration according to the invention.
Figure 7B:
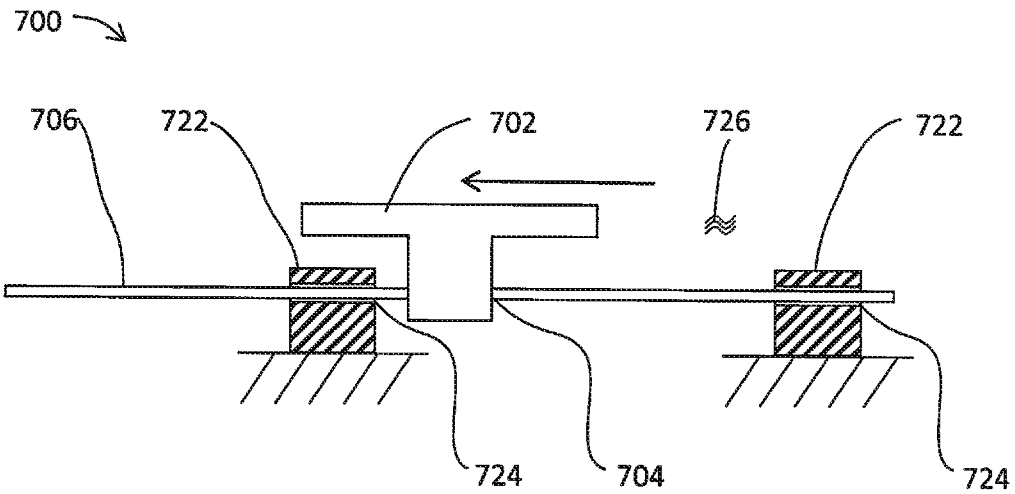
FIG. 7B is the view of FIG. 7A with the decorative element moved to the left.
Figure 8A:
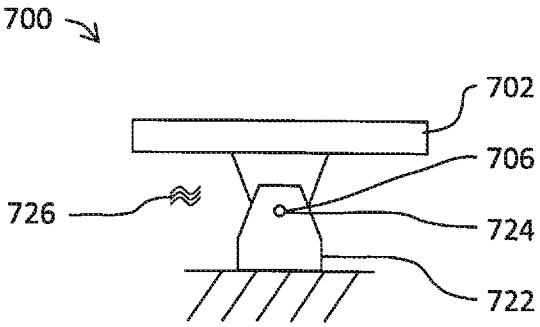
FIG. 8A is a side view of an alternate fixation on a swivel.
Figure 8B:
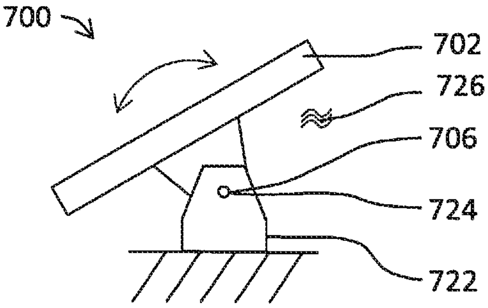
FIG. 8B is a side view of the alternate fixation of FIG. 8A showing the fixation tilted.

FIG. 7A to 7B show an example of limited free linear movement of the decoration element 702 relative to the supports 724. FIG. 8A to 8B show an example of limited free rotation movement of the decoration element 702 relative to its support 724.

Figure 9:
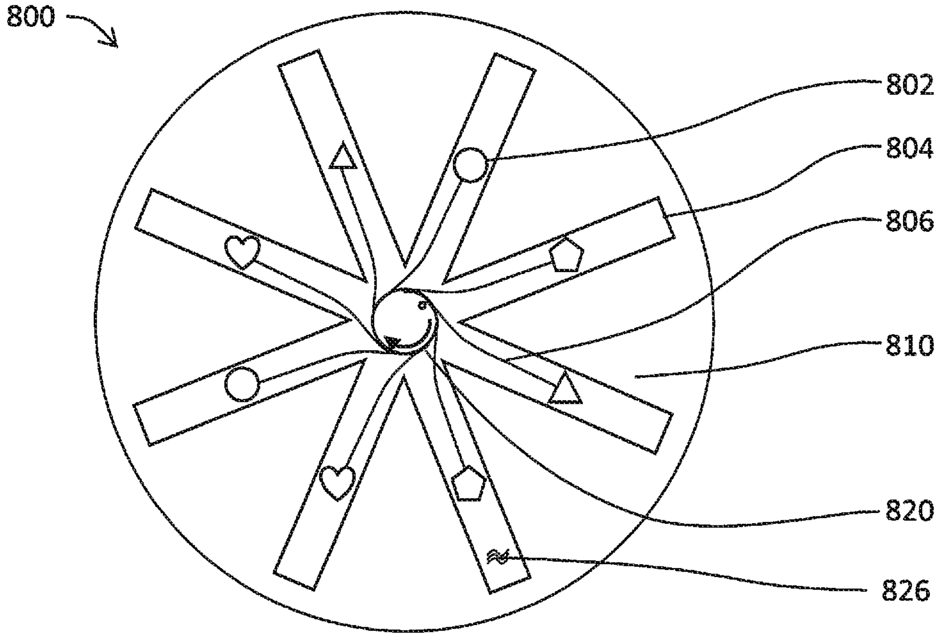
FIG. 9 is a top view of a still one more alternate fixation arrangement of the invention.
Figure 10:
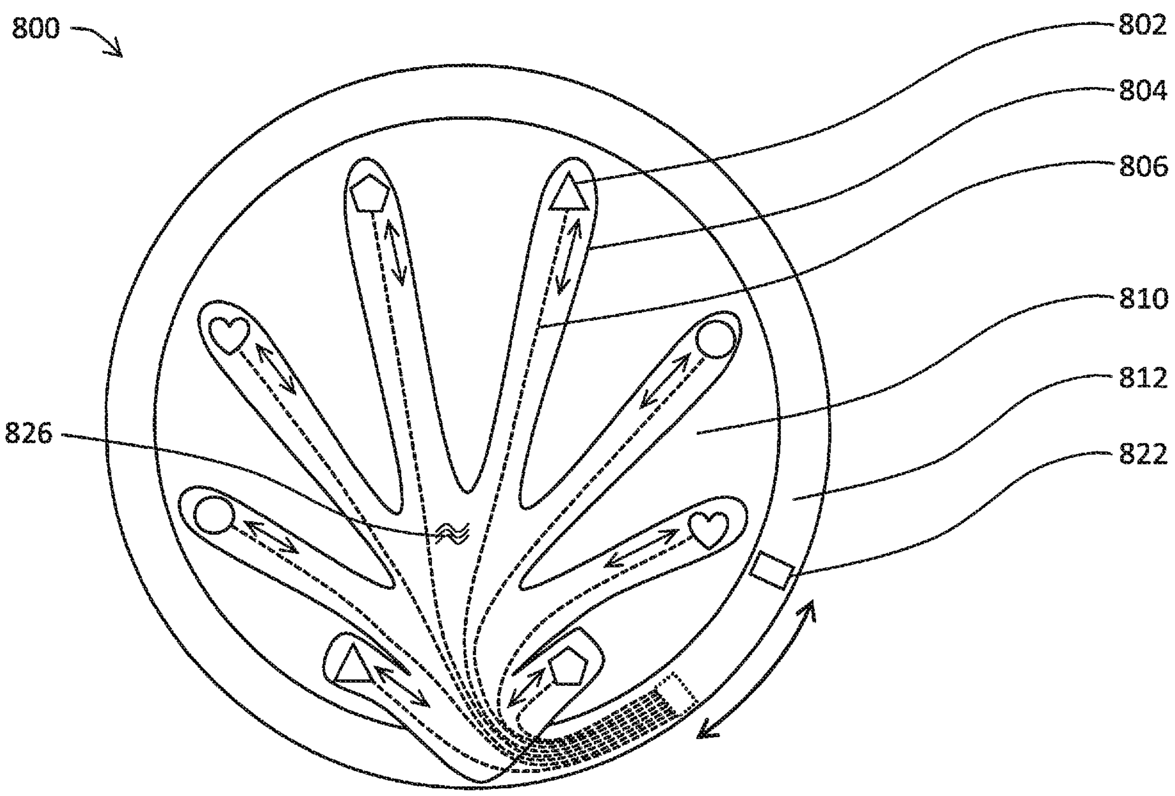
FIG. 10 is a top view of a further alternate fixation arrangement of the invention.

Referring now to FIGS. 9 and 10 the decorative elements 802 are guided by channels 804 and moved by a transmission element 806 which is transmitting a movement generated by the user via a pulley 820, a slider 822, or any other appropriate mechanism (not represented here). Instead of being generated by the user, the movement may also be generated by a clock system, such clock system being electrically or mechanically powered and may be electronically controlled. The guiding of the decorative elements 802 in the channels 804 may allow some degree of freedom in several directions to give the decorative elements 802 a more lively behavior when the system 800 is moved relative to gravity, or when the system 800 is accelerated in any direction by its wearer. Parts of the transmission mechanism that are in the visible area of the accessory 810 may be made in a material with a refraction index close to the refraction index of the surrounding fluid to be invisible. For example, the transmission elements 806 may be advantageously made of glass fibers. The surrounding fluid may be a liquid. The surrounding fluid may be transparent or colored. Parts of the transmission mechanism that are in non-visible areas of the accessory 812 may be made in any material appropriate for their function.

Figure 11A:
FIGS. 11A and 11B are schematic views of the fixation arrangement of the invention, conveying different messages.
Figure 11B:

The system is not only able to provide a "living" impression of a given image, the image remaining the same but its components moving in a random manner, but it may also be configured in such a way so as to generate different predefined images depending on the position of the mobile elements, as triggered by different orientations of the system or by the activation of the animation. An example is shown in FIGS. 11A and 11B, where the mouth orientation changes the image.

Figure 12A:
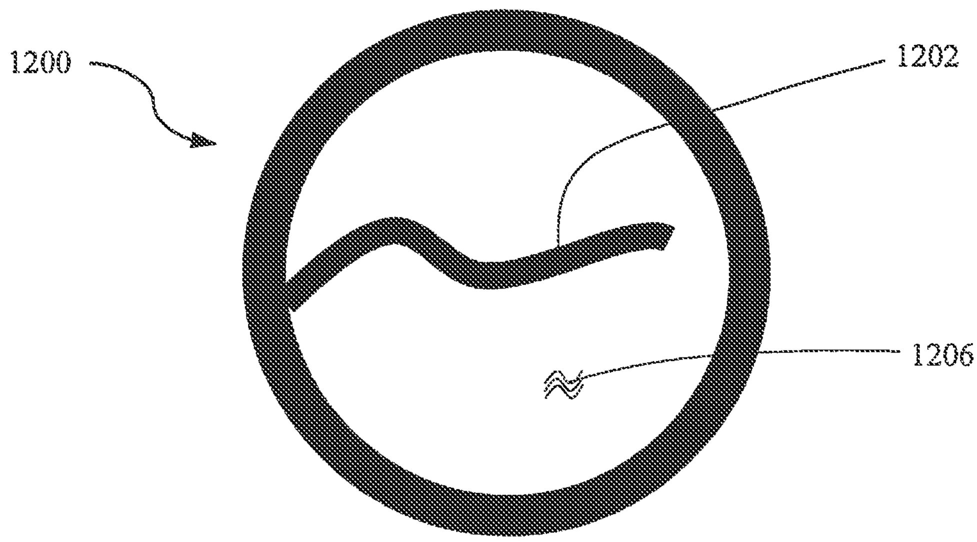
FIGS. 12A, 12B, and 12C are schematic views of a further embodiment
Figure 12B:
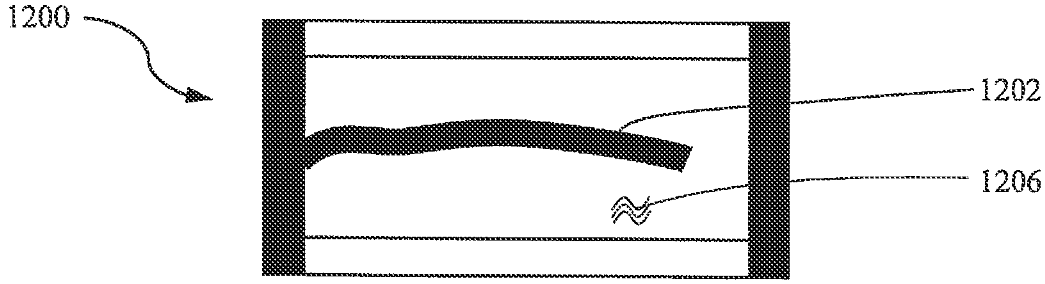
Figure 12C:
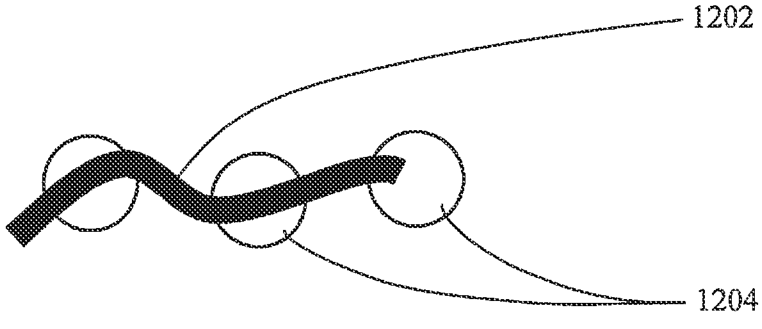

Referring now to FIGS. 12A-12C, the decorative element 1202 may be a fiber, a thread on which weights 1204 are assembled. The thread 1202 may be attached at one or both ends inside of the fluidic capsule 1200. The material of the weights 1204 may be selected so as to have a refractive index comparable to the refractive index of the one or more fluids 1206 contained in the capsule 1200, so as to be essentially invisible to the wearer. The effect of gravity on the weights 1204 combined with the physical properties of the one or more fluids 1206 such as viscosity and volumetric mass, and a movement of the wearer generates movement of the thread 1202 and the weights 1204. If the volumetric mass of the fluid 1206 surrounding the weights 1204 is higher than the volumetric mass of the weights, then the weights tend to float. If the opposite, then the weights tend to sink. In this way, the thread 1202 gives the impression of being a living organism or an animated decorative structure. Other visible decorative elements may be added to the thread, for example to represent leaves or flowers on a plant, or limbs of a living organism, or just as additional figurative or non-figurative decorative elements.

Figure 13A:
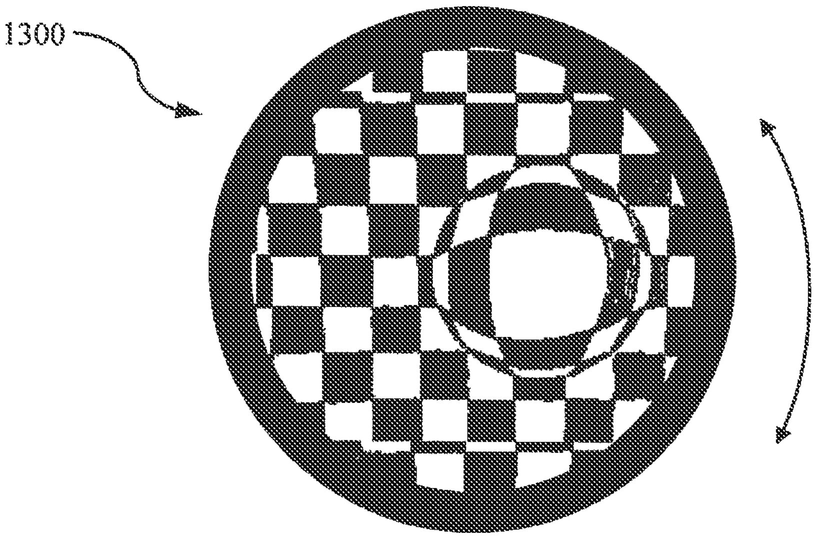
FIGS. 13A and 13B are schematic views of a further embodiment
Figure 13B:
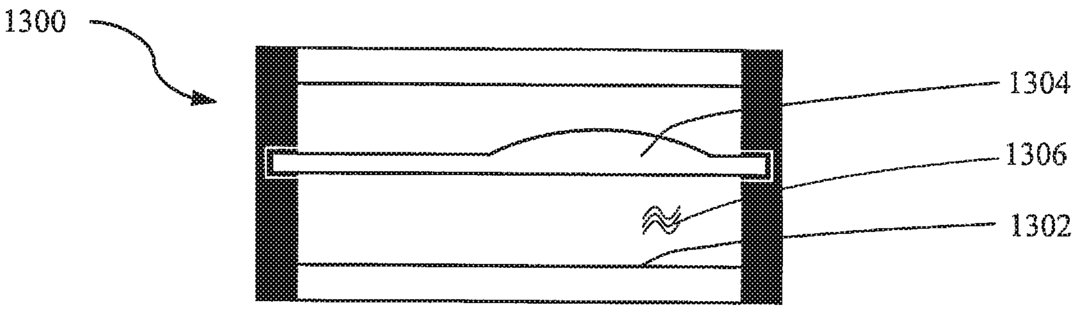

Referring now to FIGS. 13A-13B, the decorative element may be a fixed image 1302 that the wearer sees through an optical lens 1304 with a regular or irregular shape. The optical lens 1304 has some freedom of movement as allowed by its shape in combination with the internal shape of the fluidic capsule 1300. A movement of the wearer combined with the effect of gravity on the mass of the optical lens 1304 and with the physical properties of the one or more surrounding fluids 1306 (such as viscosity and volumetric mass) generates a movement of the optical lens relative to the fixed image 1302. Such movement generates an illusion of an animation of the fixed image 1302.

Figure 14A:
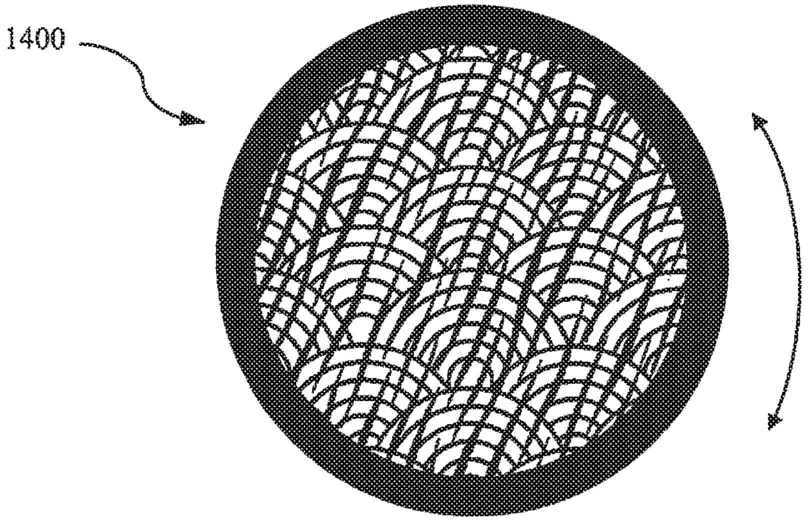
FIGS. 14A, 14B, and 14C are schematic views of a further embodiment
Figure 14B:
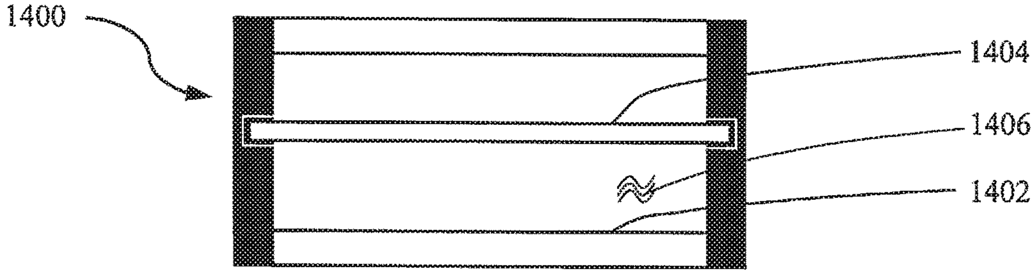
Figure 14C:
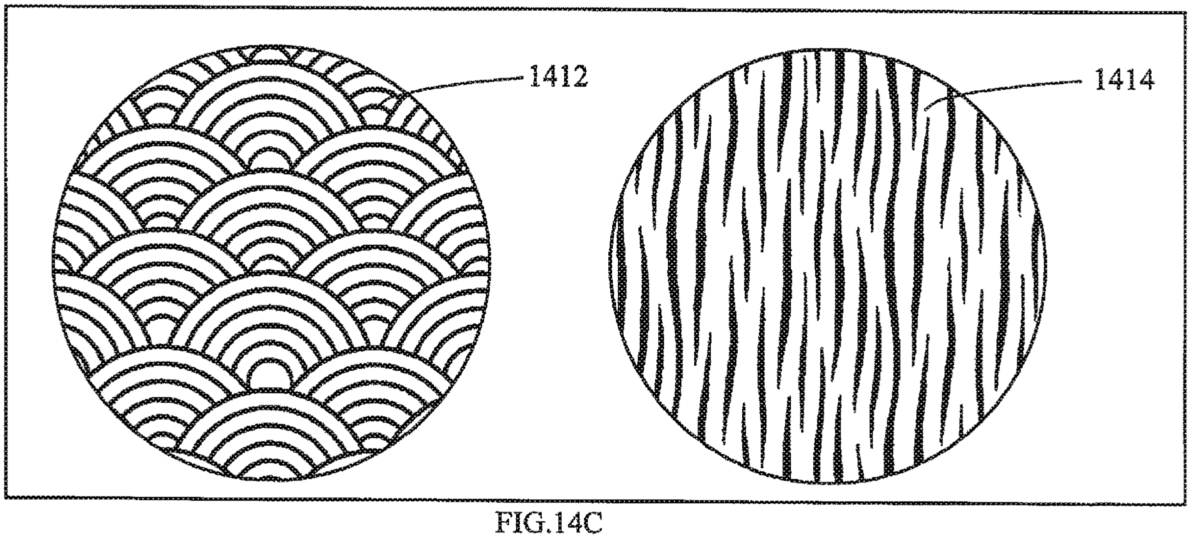

Referring now to FIGS. 14A-14C, the decorative element is a fixed image 1402 that the wearer sees through a decorated transparent plate 1404, such decoration may be a regular pattern such as a grid 1412, 1414. The decorated transparent plate 1404 has some freedom of movement as allowed by its shape in combination with the internal shape of the fluidic capsule 1400. A movement of the wearer combined with the effect of gravity on the mass of the decorated transparent plate 1404 further combined with the physical properties of the one or more surrounding fluids 1406 (such as viscosity and volumetric mass) generates a movement of the optical lens relative to the fixed image 1402. Such movement generates an illusion of an animation of the fixed image 1402. When carefully selected, the patterns of the fixed image 1402 and the decorated transparent plate 1404 may generate moiré effects. A moiré pattern or moiré fringes are large-scale interference patterns that can be produced when an opaque ruled pattern with transparent gaps is overlaid on another similar pattern. For the moiré interference pattern to appear, the two patterns must not be completely identical, but rather e.g. displaced, rotated or have slightly different pitch. Moiré patterns appear in many different situations. In printing, the printed pattern of dots can interfere with the image. In television and digital photography, a pattern on an object being photographed can interfere with the shape of the light sensors to generate unwanted artifacts. They are also sometimes created deliberately—in micrometers they are used to amplify the effects of very small movements.

Figure 15A:
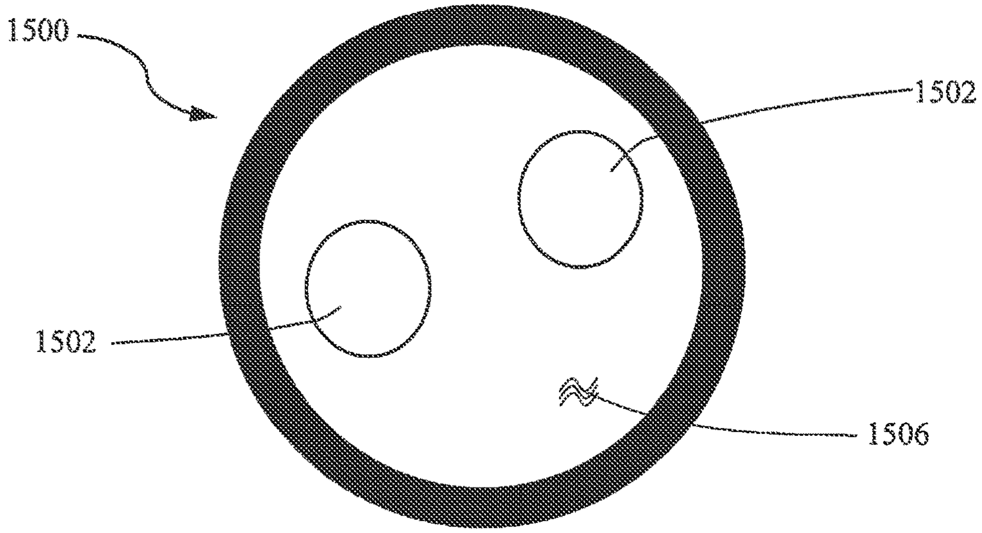
FIGS. 15A and 15B are schematic views of a further embodiment
Figure 15B:
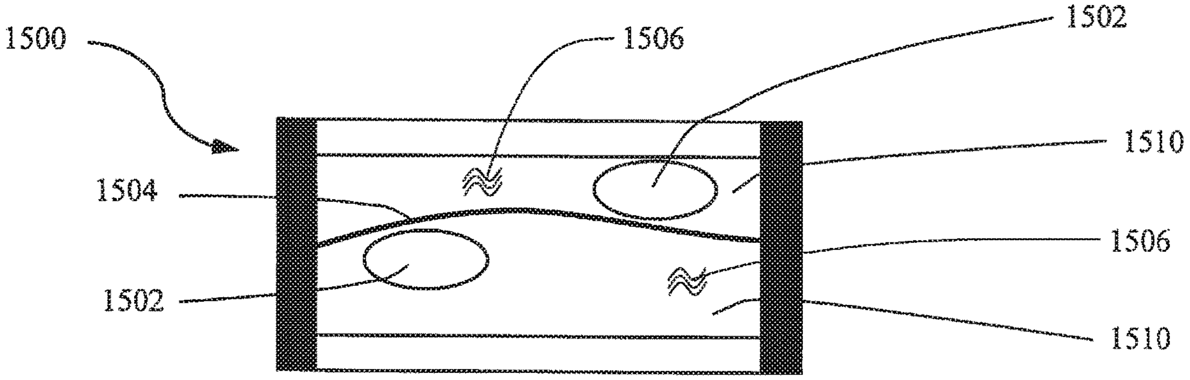

Referring now to FIGS. 15A-15B, the decorative elements may be a combination of mobile elements 1502 moving freely in cavities 1510 delimited by one or more transparent flexible films 1504 within the fluidic capsule 1500. The separation of the fluidic capsule 1500 into cavities 1510 allows the free collision/free movement of the mobile elements 1502. The flexible film 1504 has a high flexibility and may present one or more holes or openings to allow the circulation of the fluid 1506 between the cavities 1510. The flexible film may be attached only at a limited number of locations within the fluidic capsule to allow more freedom of movement. The refraction index of the film 1504 may be selected so as to be close to the refraction index of the surrounding fluid 1506. The film may include visible parts attached to it, or printed decorations that have a living effect when the film moves.

Figure 16A:
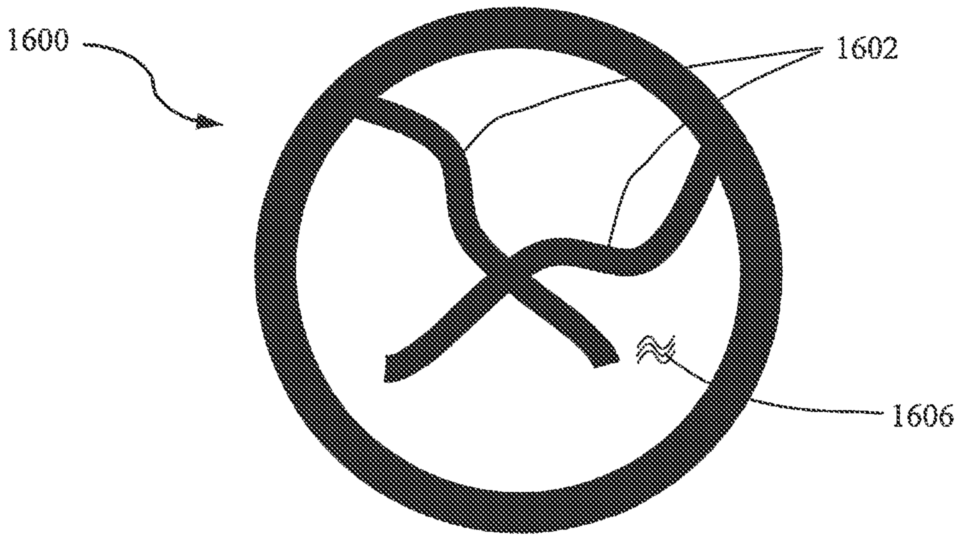
FIGS. 16A, 16B, and 16C are schematic views of a further embodiment
Figure 16B:
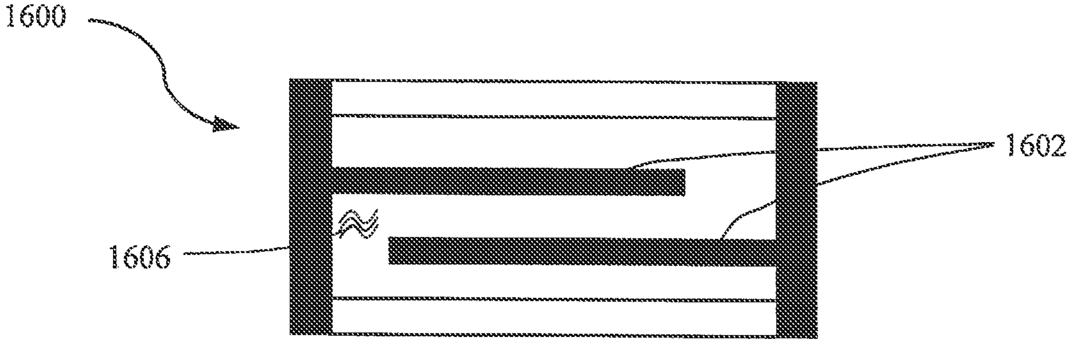
Figure 16C:

Referring now to FIGS. 16A-16C, the decorative elements 1602 may be made of chains of articulated elements 1610 with restricted movement freedom. A chain 1602 may be attached at one end to the fluidic capsule 1600 and be free to move at the other end. Some of the articulated elements 1610 may be made of a material with the same refraction index as the surrounding fluid 1606 so as to be substantially invisible, and some other articulated elements 1610 may be made of decorative elements, optionally made of precious materials. The articulation 1612 between the elements 1610 may allow for a limited or full movement freedom. When the articulation 1612 limits the movement freedom to a plane, several chains 1602 may be installed besides each other, and several layers of chains 1602 may be installed in front of each other, creating a 3D landscape.

Figure 17A:
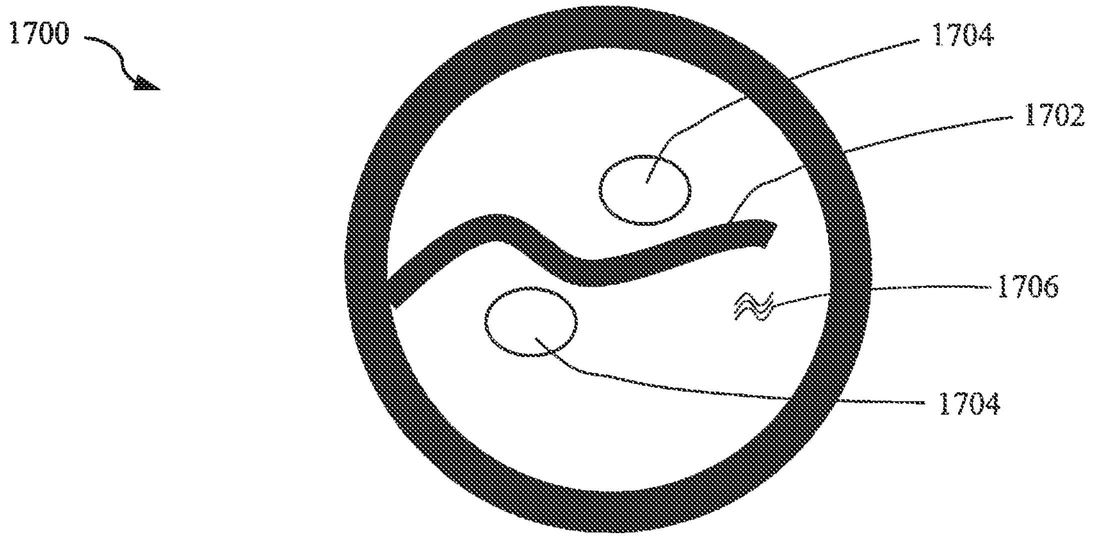
FIGS. 17A, 17B, and 17C are schematic views of a further embodiment
Figure 17B:
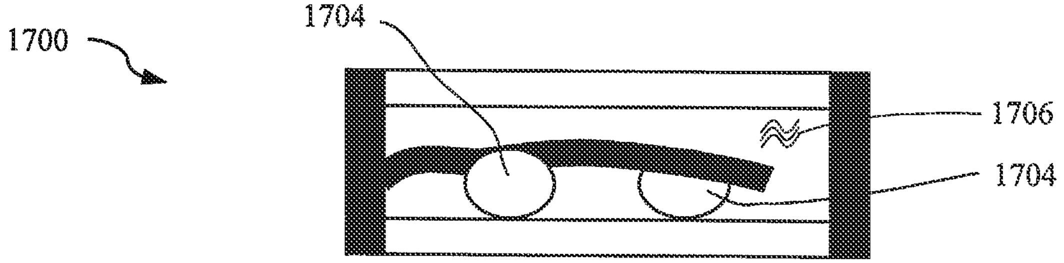
Figure 17C:
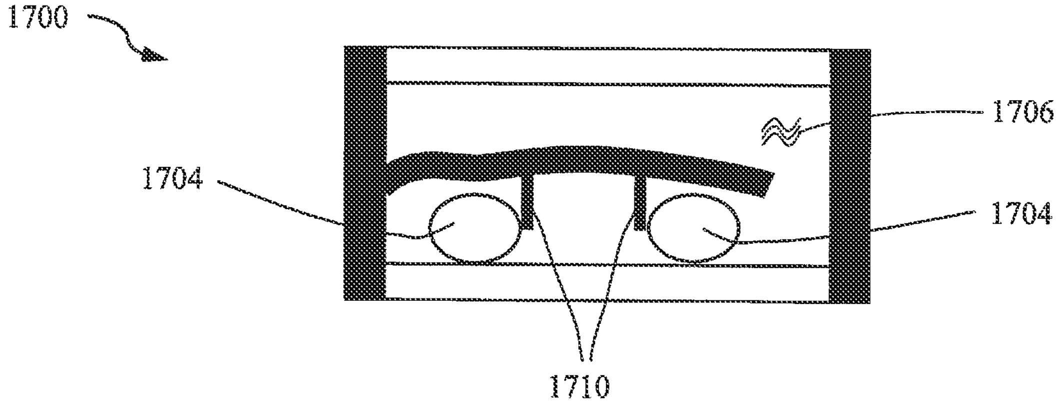

Referring now to FIGS. 17A-16C, the decorative elements 1702 may be made in any of the forms described above, and the fluidic capsule 1700 may include at least one mobile elements 1704 able to move freely, actuated by the combination of their own density relative to the density of the fluid 1706 and the orientation of the capsule 1700 relative to gravity. Some of the at least one mobile elements 1704 may share a substantially similar refraction index as the refraction index of the fluid 1706 contained in the capsule 1700 so as to be invisible to an observer. The movement of the mobile element 1704 may lead to collisions with the decorative element 1702, increasing the movement of the mobile elements and thereby increasing the animation effect. The decorative elements 1702 may include protrusions 1710 so as to favor the happening of collisions with the mobile elements 1704. The protrusions 1710 may share a substantially similar refraction index as the refraction index of the fluid 1706 contained in the capsule 1700 so as to be invisible to an observer.

Figure 18:
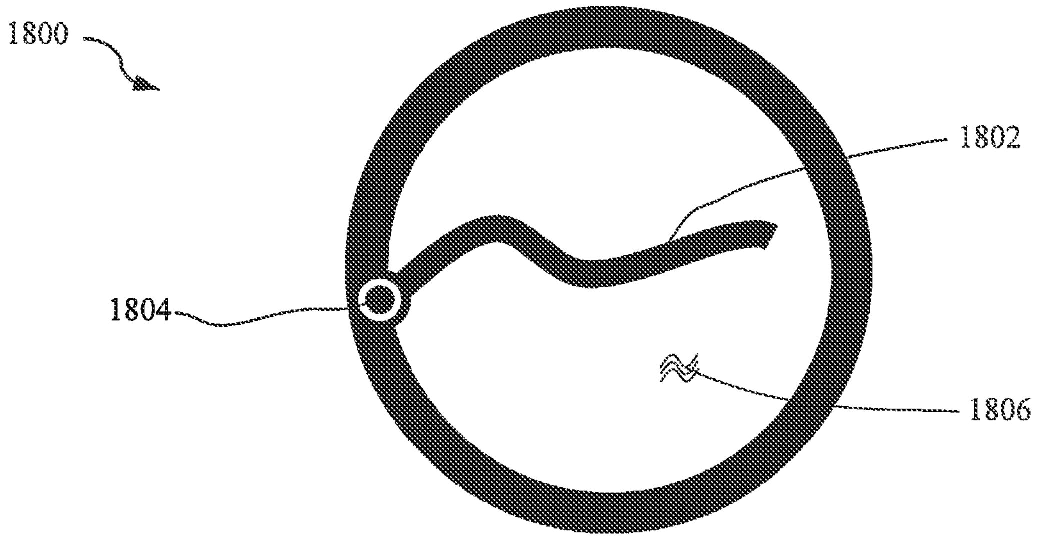
FIG. 18 is a schematic view of a further embodiment

Referring now to FIG. 18, the decorative elements 1802 may be made of at least one rigid or flexible element such as described above, attached to the fluidic capsule 1800 via an articulation 1804, actuated by the combination of its own weight and the orientation of the capsule 1800 relative to gravity. Parts of the at least one rigid or flexible element 1802 and the articulation 1804 may share a substantially similar refraction index as the refraction index of the fluid 1806 contained in the capsule 1800 so as to be invisible to an observer.

The decorative elements form together one or more images. Within the entirety of this application, it shall be understood that images may be figurative and non-figurative representations. The decorative elements may be of various sizes and shapes, and may be made of polymers, metal, precious metal, may be crystals, diamonds, encapsulated fluids or gels, or any decorative element as appropriate for the purpose of creating one or more images.

The fluidic capsule 1200, 1300, 1400, 1500, 1600, 1700, 1800 is made of a bottom plate, sidewalls and a see-through window, such window made of sapphire, glass, plastic or any other appropriate transparent material, and filled with one or more fluids 1206, 1306, 1406, 1506, 1606, 1706, 1806, such fluids having selected viscosity, refraction index and volumetric mass in order to interact with the decorative mobile elements and allow for variables degrees of visibility for the user. The bottom plate of the fluidic capsule 1200, 1300, 1400, 1500, 1600, 1700, 1800 may be made of transparent material to allow the wearer to see elements placed below the fluidic capsule through said fluidic capsule.

Some mobile elements may be hidden in a non-visible part of the system, and appear when the animation is triggered.

Some mobile elements may hide each other in certain positions of the system, and the hidden mobile element would suddenly appear in the image when the animation is triggered.

Some elements may change color when they are on top of each other, for example a semi-transparent yellow part on top of a semi-transparent blue part would appear green.

It should be appreciated that the particular implementations shown and herein described are representative of the invention and its best mode and are not intended to limit the scope of the present invention in any way.

In an advantage, the system and method/apparatus creates an apparently living decoration for personal accessories.

In another advantage, the invention animate decorative objects.

In another advantage, the invention changes its appearance when moved.

In still another advantage, the invention provides an invisible and partially moveable fixation to objects and thus provide a magical effect.

As will be appreciated by skilled artisans, the present invention may be embodied as a system, a device, or a method.

Moreover, the system contemplates the use, sale and/or distribution of any goods, services or information having similar functionality described herein.

The specification and figures should be considered in an illustrative manner, rather than a restrictive manner, and all modifications described herein are intended to be included within the scope of the invention claimed. Accordingly, the scope of the invention should be determined by the appended claims (as they currently exist or as later amended or added, and their legal equivalents) rather than by merely the examples described above. Steps recited in any method or process claims, unless otherwise expressly stated, may be executed in any order and are not limited to the specific order presented in any claim. Further, the elements and/or components recited in apparatus claims may be assembled or otherwise functionally configured in a variety of permutations to produce substantially the same result as the present invention. Consequently, the invention should not be interpreted as being limited to the specific configuration recited in the claims.

Benefits, other advantages and solutions mentioned herein are not to be construed as critical, required or essential features or components of any or all the claims.

As used herein, the terms "comprises", "comprising", or variations thereof, are intended to refer to a non-exclusive listing of elements, such that any apparatus, process, method, article, or composition of the invention that comprises a list of elements, that does not include only those elements recited, but may also include other elements such as those described in the instant specification. Unless otherwise explicitly stated, the use of the term "consisting" or "consisting of" or "consisting essentially of" is not intended to limit the scope of the invention to the enumerated elements named thereafter, unless otherwise indicated. Other combinations and/or modifications of the above-described elements, materials or structures used in the practice of the present invention may be varied or adapted by the skilled artisan to other designs without departing from the general principles of the invention.

The patents and articles mentioned above are hereby incorporated by reference herein, unless otherwise noted, to the extent that the same are not inconsistent with this disclosure.

The invention can be summarized by the following feature sets.

1. A system (100, 200, 300, 400, 500, 600, 700, 800, 1200, 1300, 1400, 1500, 1600, 1700, 1800) comprising at least one decorative element (102, 204, 302, 402, 502, 602, 702, 802, 1202, 1302, 1304, 1402, 1404, 1502, 1602, 1702, 1704, 1802) mechanically and moveably suspended in a fluid (116, 206, 326, 426, 510, 610, 726, 826, 1206, 1306, 1406, 1506, 1606, 1706, 1806) by mechanical fixation elements, wherein a combination of (a) the density of the decorative element, (b) the density of the fluid, (c) the viscosity of the fluid, and/or (d) a change of the orientation of the system relative to gravity generates a movement of the at least one decorative element.
2. The system of feature set 1, wherein the at least one decorative element (102, 204, 302, 402, 502, 602, 702, 802, 1202, 1302, 1304, 1402, 1404, 1502, 1602, 1702, 1704, 1802) contains at least one flotation element to locally modify its density so that the movement is enhanced, in that when the flotation element's density is lower than the fluid density the flotation element tends to float and tilt the decorative element upwards, and that when the flotation element's density is greater than the fluid density the flotation element tends to sink and tilt the decorative element downwards.
3. The system of feature set 2, wherein the at least one flotation element shares a substantially similar refraction index as the refraction index of the fluid so as to be invisible to an observer.
4. The system of feature sets 1, 2 or 3, wherein the at least one decoration element is a flexible thread.
5. The system of feature sets 1, 2 or 3, wherein the at least one decoration element is an articulated chain (202, 1602).
6. The system of feature sets 1, 2 or 3, wherein the at least one decoration element is rigid and the mechanical fixation is an articulation (1610, 1804).
7. The system of the above feature sets, including mobile elements which are free to move and actuated by the combination of their own density relative to the density of the fluid and a change of the orientation of the system relative to gravity.
8. The system of feature set 7, wherein the mobile elements collide with the at least one decorative element, increasing the animation effect.
9. The system of feature set 8, wherein at least one of the mobile elements shares a substantially similar refraction index as the refraction index of the surrounding fluid so as to be invisible to an observer.
10. The system of feature set 9, wherein at least one of the decorative elements has at least one protrusion (1710) so as to favor the happening of collisions with the at least one mobile elements.
11. The system of feature set 1, wherein the system is a watch having a casing sealed with a crystal and the fluid is enclosed in the casing visible to a wearer through the crystal.
12. The system of any of the above feature sets, wherein the decorative element (102, 204, 302, 402, 502, 602, 702, 802, 1202, 1302, 1304, 1402, 1404, 1502, 1602, 1702, 1704, 1802) is selected from one of the group of decorative elements consisting of a fiber optionally attached at one or both ends inside a fluidic capsule, a thread on which weights are assembled optionally selected so as to have a refractive index comparable to the refractive index of the one or more fluids (116, 206, 326, 426, 510, 610, 726, 826, 1206, 1306, 1406, 1506, 1606, 1706, 1806) contained in the capsule so as to be essentially invisible to the wearer, a fixed image that the wearer sees through an optical lens with a regular or irregular shape, a fixed image that the wearer sees through a decorated transparent plate, such decoration may be a regular pattern such as a grid and a combination of mobile elements moving freely in cavities delimited by one or more transparent flexible films within the fluidic capsule, and chains of articulated elements with restricted movement freedom.

13. The system of any of the above feature sets, wherein the effect of gravity on weights combined with physical properties of the one or more fluids and a movement of the wearer generates movement of the fiber or thread.
14. The system of the above feature set, wherein the physical properties of the one or more fluids is viscosity or volumetric mass.
15. The system of the above feature sets wherein, if the volumetric mass of the fluid (116, 206, 326, 426, 510, 610, 726, 826, 1206, 1306, 1406, 1506, 1606, 1706, 1806) surrounding the weights is higher than the volumetric mass of the weights, then the weights tend to float, and if the opposite, then the weights tend to sink, giving the thread the impression of being a living organism or an animated decorative structure.
16. The system of the above feature sets wherein other visible decorative elements (114, 204, 306, 502, 602, 702, 802, 1204, 1304, 1404,) are added to the thread, for example to represent leaves or flowers on a plant, or limbs of a living organism, or just as additional figurative or non-figurative decorative elements.
17. The system of feature set 3 an optical lens connected to the system 1300, 1400 has some freedom of movement as allowed by its shape in combination with the internal shape of the fluidic capsule such that a movement of the wearer combined with the effect of gravity on the mass of the optical lens and with the physical properties of the one or more surrounding fluids (116, 206, 326, 426, 510, 610, 726, 826, 1206, 1306, 1406, 1506, 1606, 1706, 1806) generates a movement of the optical lens (1304) relative to the fixed image, thereby generating an illusion of an animation of the fixed image.
18. The system of the above feature set, wherein the physical properties of the one or more fluids (116, 206, 326, 426, 510, 610, 726, 826, 1206, 1306, 1406, 1506, 1606, 1706, 1806) is viscosity or volumetric mass.
19. The system of feature set 12, wherein the system comprises a grid (1412, 1414), the grid (1412, 1414) optically interferes with the patterns of the fixed image and the decorated transparent plate generate moiré effects.
20. A method consisting of animating a decorative object, such as personal wearables, watches, jewelry, leather goods, apparel, accessories, using the system of feature set 1.
21. The system according any of the preceeding feature sets including a thermal compensation system such as disclosed in PCT Application No. PCT/IB2015/000448.
22. The system according any of the preceeding feature sets including an electrically powered special effect elements and an electricity generating system such as disclosed in PCT Application No. PCT/IB2016/000249.
23. The system(s) and/or method(s) as described in the instant specification, dependent feature sets, abstract (herein incorporated by reference), and/or drawing figures.

Other characteristics and modes of execution of the invention are described in the appended claims.

Materials used for the realization of the present invention are chosen to be suitable and in compliance to the operating temperature range of the invention. Such materials are e.g. metals, polymers or glass, and in particular sapphire glass. Equally for structures used for the realization of the present invention, such structures, as e.g. bellows, chips, or intrinsic membranes, are configured to be suitable and in compliance to the operating temperature range of the invention.

The system may include a thermal compensation system, the system comprising a mechanism accommodating thermal expansion and/or contraction of the liquid, avoiding the generation of unacceptably high pressure which could result in liquid leaking out of the system in case of temperature rise, or the generation of unattractive gas bubbles in the liquid in case of low temperature. Such thermal compensation may be made partially or completely invisible to the wearer. Such systems are disclosed in PCT Application No. PCT/IB2015/000448 of the same applicant, entitled SYSTEMS AND METHODS FOR ABSORPTION/EXPANSION/CONTRACTION/MOVEMENT OF A LIQUID IN A TRANSPARENT CAVITY, filed on 7 Apr. 2015, the contents of which are incorporated herein by reference thereto and relied upon.

Furthermore, the present invention may accommodate and employ a miniature, user-powered portable device for triggering the operation of an electric power consuming element, which is preferably wearable, employs mechanical energy storage and incorporates miniature special effect elements which are activated on-demand for a limited duration for backlighting, illumination, or other special effect purposes without the need for a battery or other electrochemical storage device. The device comprises a manual spring loading mechanism, a spiral spring, a manual trigger mechanism, a transmission for increasing the rotational speed, a miniature generator, and at least one electric power consuming element such as a transmitter or a light source, preferably a light emitting diode. Such a device are disclosed in PCT Application No. PCT/IB2016/000249 of the same applicant, entitled MINIATURE USER-POWERED LIGHTING DEVICE, SYSTEM AND METHOD OF USING SAME, filed on 7 Mar. 2016, the contents of which are incorporated herein by reference thereto and relied upon.

Further, the invention should be considered as comprising all possible combinations of every feature described in the instant specification, appended claims, and/or drawing figures that may be considered new, inventive and industrially applicable.

Copyright may be owned by the Applicant(s) or their assignee and, with respect to express Licensees to third parties of the rights defined in one or more claims herein, no implied license is granted herein to use the invention as defined in the remaining claims. Further, vis-à-vis the public or third parties, no express or implied license is granted to prepare derivative works based on this patent specification, inclusive of the appendix hereto and any computer program comprised therein.

Additional features and functionality of the invention are described in the claims appended hereto and/or in the abstract. Such claims and/or abstract are hereby incorporated in their entirety by reference thereto in this specification and should be considered as part of the application as filed.

Multiple variations and modifications are possible in the embodiments of the invention described here. Although certain illustrative embodiments of the invention have been shown and described here, a wide range of changes, modifications, and substitutions is contemplated in the foregoing disclosure. While the above description contains many specific details, these should not be construed as limitations on the scope of the invention, but rather exemplify one or another preferred embodiment thereof. In some instances, some features of the present invention may be employed without a corresponding use of the other features. Accordingly, it is appropriate that the foregoing description be construed broadly and understood as being illustrative only, the spirit and scope of the invention being limited only by the claims that ultimately issue in this application.

What is claimed is:

1. A portable fluidic animation system having a capsule comprising at least one decorative element, the capsule filled with one or more fluids, the one or more fluids having a selected viscosity, refraction index, or a volumetric mass enabling an interaction with the at least one decorative element such that a mechanical fixation element which fixes or limits motion of the at least one decoration element has substantially the same refractive index as the one or more fluids so as to be essentially invisible therein, said at least one decorative element mechanically and moveably suspended in the one or more fluids by the mechanical fixation element, wherein a combination of (a) the density of the at least one decorative element, (b) the density of the fluid, (c) the viscosity of the one or more fluids, and/or (d) a change of the orientation of the capsule relative to gravity generates an animation or movement of the at least one decorative element.

2. The system of claim 1, wherein the at least one decorative element contains at least one flotation element to locally modify its density so that movement is enhanced, in that when the density of the flotation element is lower than the density of the one or more fluids, the flotation element tends to float and tilt the at least one decorative element upwards, and that when the density of the flotation element is greater than the density of the one or more fluids, the flotation element tends to sink and tilt the at least one decorative element downwards.

3. The system of claim 2, wherein the at least one flotation element shares a substantially similar refraction index as the refraction index of the one or more fluids so as to be invisible to an observer in at least one of the one the one of more fluids.

4. The system of claim 3 including an optical lens connected to the system having some freedom of movement as allowed by the optical lens's shape in combination with the internal shape of the capsule such that a movement of a wearer combined with gravity on the mass of the optical lens and with the physical properties of the one or more surrounding fluids generates a movement of the optical lens relative to the fixed image, thereby generating an illusion of an animation of a fixed image.

5. The system of claim 4, wherein the physical properties of the one or more fluids is viscosity or volumetric mass.

6. The system of claim 1, wherein the at least one decoration element is a thread that is flexible.

7. The system of claim 1, wherein the at least one decoration element is an articulated chain.

8. The system of claim 1, wherein the at least one decoration element is rigid and the mechanical fixation element is an articulating element.

9. The system of claim 1, including mobile elements which are free to move and actuated by a combination of the densities of the mobile elements relative to the density of the at least one fluid and a change of orientation of the system relative to gravity.

10. The system of claim 9, wherein the mobile elements collide with the at least one decorative element, increasing an animation effect.

11. The system of claim 10, wherein at least one of the mobile elements shares a substantially similar refraction index as the refraction index of surrounding fluid so as to be invisible to an observer.

12. The system of claim 11, wherein at least one of decorative element has at least one protrusion so as to favor collisions with the at least one of the mobile elements.

13. The system of claim 1, wherein the system is a watch having a casing sealed with a crystal and the at least one fluid is enclosed in the casing visible to a wearer through the crystal.

14. The system of claim 1, wherein the at least one decorative element is selected from one of the group of the at least one decorative elements consisting of a fiber optionally attached at one or both ends inside the capsule, a thread on which weights are assembled selected so as to have a refractive index comparable to the refractive index of the one or more fluids contained in the capsule so as to be essentially invisible to a wearer, a fixed image that the wearer sees through an optical lens with a regular or irregular shape, a fixed image that the wearer sees through a decorated transparent plate which decorated transparent plate may be a regular pattern such as a grid and a combination of mobile elements moving freely in cavities delimited by one or more transparent flexible films within the capsule, and chains of articulated elements with restricted movement freedom.

15. The system of claim 14, wherein the system comprises a grid, the grid optically interferes with patterns of a fixed image and a decorated transparent plate generates interference effects.

16. The system of claim 1, wherein gravity on weights combined with physical properties of the one or more fluids and a movement of a wearer generates movement of a thread or a fiber.

17. The system of claim 16, wherein the physical properties of the one or more fluids is viscosity or volumetric mass.

18. The system of claim 1 wherein, if the at least one fluid's volumetric mass surrounding the weights is higher than the weights' volumetric mass, then the weights tend to float, and if the opposite, then the weights tend to sink, giving a thread attached to the weights the impression of being a living organism or an animated decorative structure.

19. The system of claim 1 wherein other visible decorative elements are added to a thread attached to the at least one decorative element.

20. A method consisting of animating a decorative object selected from one of the group of decorative objects consisting of personal wearables, watches, jewelery, leather goods, apparel, accessories, using the system of claim 1.

21. The system according to claim 1 including a thermal compensation element.

22. The system according to claim 1 including an electrically powered special effect elements and an electricity generating system.

* * * * *